FAST APPROCH

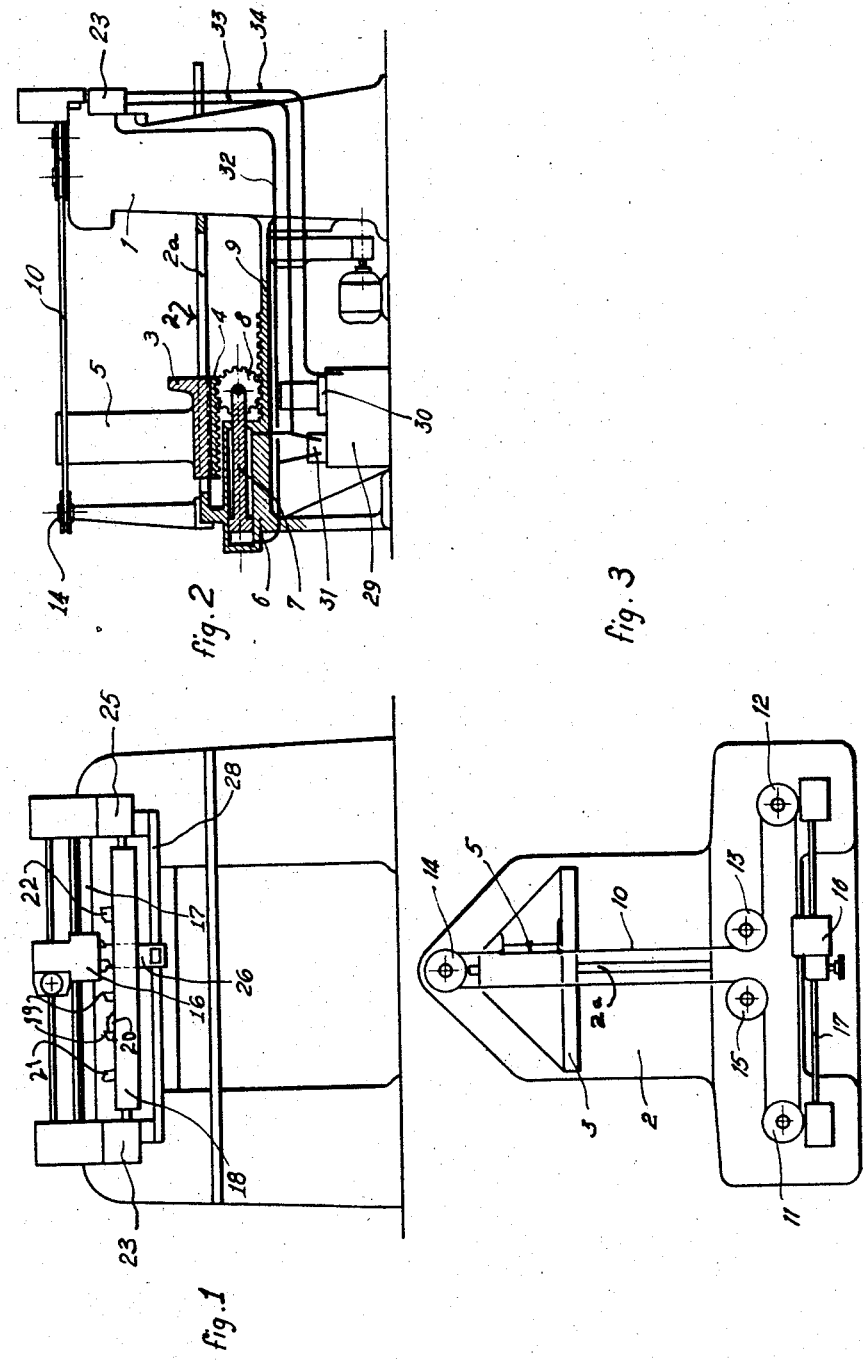

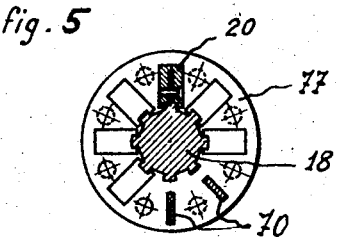
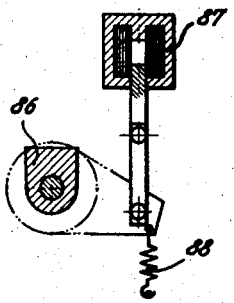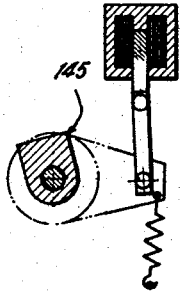
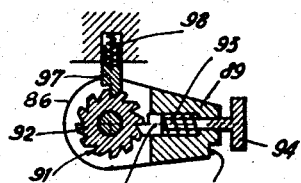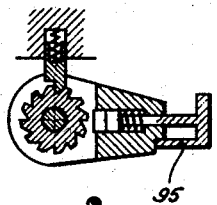
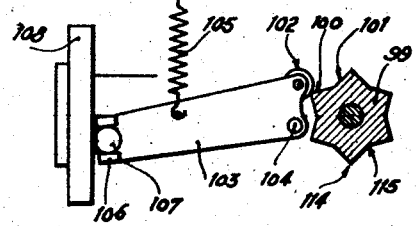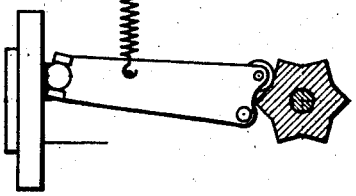
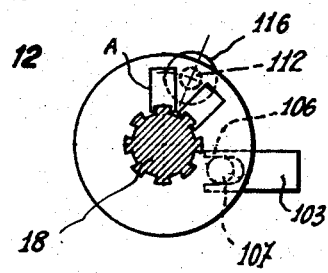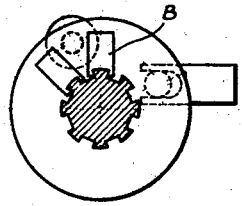

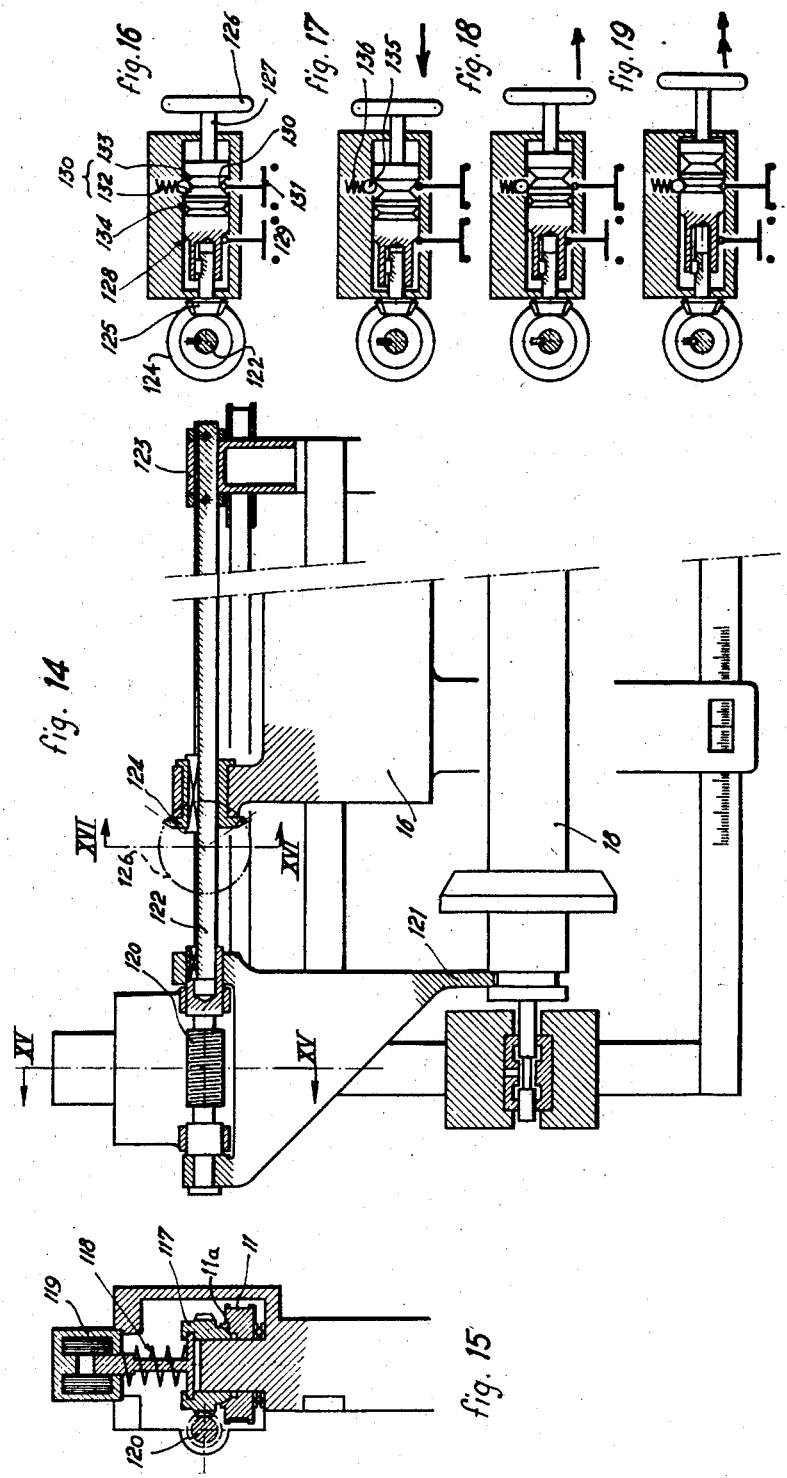

SLOW APPROCH

STAND STILL

SLOW RETURN

FAST RETURN

Automatic Control — Manual Control

137 Rapid Rate Feed and Return

146 Finger Retracting Control

67 Rapid Rate Auxiliary Indexing Control

87 Clutch Control

119

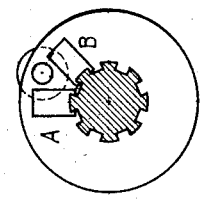
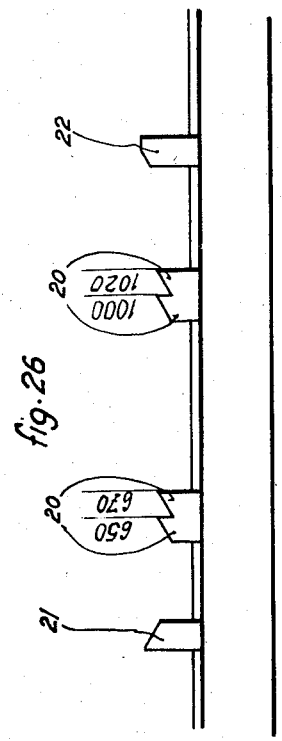
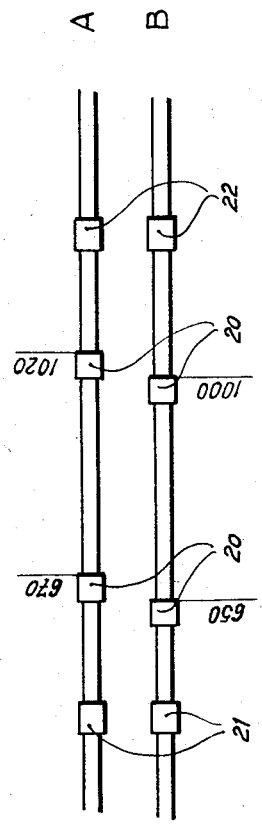

United States Patent Office 2,855,752
Patented Oct. 14, 1958

2,855,752

HYDRAULIC DEVICE FOR CONTROLLING THE FEED AND STOP POSITION OF A MACHINE ELEMENT IN CUTTING, SAWING AND SLICING MACHINES

Rene Le Brusque, Malakoff, France

Application October 18, 1956, Serial No. 616,835

Claims priority, application France October 21, 1955

25 Claims. (Cl. 60—52)

The present invention relates to a hydraulic device for driving and controlling, as regards both speed and position, the movements of a machine part or of a material to be worked in a machine where great accuracy is required as to exact end positioning of the part or material. The invention is described hereinafter in its particular application to the rear stack-register of a paper guillotine, but it is to be understood that the hydraulic device of the invention is just as readily applicable to presses, saws, millers or slicers, and that a paper guillotine has been selected merely as one example of a machine wherein it is necessary to provide rapid forward and return movements in conjunction with slow forward movements of a register to move a stack of paper sheets to an accurately determined stop position at which the stack is worked.

More particularly the device permits the displacement of the register step by step in order to carry out a whole series of regular or irregular cuts on a same paper stack in accordance with one or more predetermined programs for which the machine can be set.

There exist a number of known devices for effecting the movements of the register of a paper guillotine. The oldest ones with so-called mechanical drive cannot achieve the accuracy demanded by the users of these machines. It is known that these devices permit, for example, to carry out cuts of regular and repetitive magnitude, but the unavoidable inaccuracy of the mechanisms which determine the magnitude of the forward step is multiplied by the number of cuts, and the final result counted over the total length of the ream to be cut is found to be affected by this amount.

These mechanical devices cannot achieve the versatility required for rational working conditions, such as in mass production and it is well known that for completely cutting off the four faces of a paper stack to a given size the operator must carry out manipulations of the stack which are excessive both as regards number and magnitude.

Furthermore the known mechanical devices are not readily adjustable as to the magnitude of the deceleration of the forward step at the end of each movement of the register. Owing to this fact it is very difficult to maintain the accuracy of stopping at a constant value regardless of the nature of the products to be cut. It is well known in this connection that the coefficient of friction on the work table of these various paper products presents very widely differing values, and consequently they call for appropriate variations of the periods or rates of retardation.

Other so-called hydraulic devices achieve an appreciable improvement. In fact the devices with hydraulic drive present many qualities required in this connection: power, speed of movement, almost complete absence of inertia in the rversing of the stroke. However they do not ordinarily permit as accurate a positional control as would be desirable. Moreover in the known hydraulic devices of this kind, the control of the rate of forward movement required, on the one hand, by the differences in the force for moving the register and, on the other hand, by the unavoidable difference of the viscosity of the oil with varying temperature has been achieved only by systems of hydraulic valves, so-called constant pressure or constant flow valves controlled by the variations in pressure of the circuit, but independently of the forward movement of the register. All these control systems offer the disadvantage of responding only with a certain delay which makes impossible any accuracy of the forward movement; finally they can function correctly only at very low speeds.

One object of the invention is to provide a hydraulic control device which permits to control the forward movement of the register in a paper guillotine with the same accuracy as devices with mechanical drive, while preserving the power and smoothness inherent to hydraulic devices, and to attain moreover an accuracy in coming to a standstill at the end of a stroke far superior to that of ordinary hydraulic devices.

Another object of the invention is to control the movement of the register in a paper guillotine by means of a hydraulic device of known type actually used solely as a precision copying device on machine tools. This kind of device is described in Patents Nos. 2,592,812 and 2,601,-157.

The present invention is characterised substantially by the provision of a hydraulic circuit wherein the fluid is in permanent circulation, the movements of the register being controlled continuously by the calibration of one or two orifices provided in the fluid circuits, this calibration modifying the pressures of the fluid on the two faces of a piston driving the register. The member controlling this calibration is constituted by a feeler valve movable with a bar or barrel supporting a series of abutments or stops and sliding freely and axially in end guides. This axial movement permits the abutments or stops carried by the barrel to be constantly drawn into or maintained in contact with a reference finger, movable along a ruler, but always in fixed connection with the register of the paper guillotine.

According to the present invention this feeler valve co-operates with a flank of the reference finger controlled in its movements by the forward movement of the register. It follows therefrom that any error in the position chosen for the register is transmitted invariably as a modification of the normal value of the reaction exercised by the reference finger on the feeler and, therefore, as a slight displacement of the feeler which consequently modifies the distribution of fluid in such a manner as to correct the position of the register by the amount required.

The device according to the invention comprises a mechanism for automatically raising the reference finger in order to effect rapid stroke movements of the register in both directions, in such a manner as to carry out all the conceivable combinations of the working cycle.

The programming of a working cycle is made easier by the possibility of setting on the barrel a series of dogs or stops forming multiple abutments. Moreover, by putting into play a device for the partial and automatic oscillation of the barrel, it is advantageous to combine two or more of the small abutment stops into a multiple dog in order to carry out the more complicated working cycles.

Finally with the object of providing a machine for universal applicability suitable both for large and small production, the device according to the invention can be combined advantageously with clutch devices permitting manual control for the accurate adjustment of the position of the finger, with or without an abutment, as well as accelerated movements, particularly a rapid forward or return movement of the register.

The accompanying drawings show by way of example, but not of limitation an embodiment of the invention as applied to a paper guillotine.

Figures 1, 2 and 3 show three external views of the paper guillotine provided with a hydraulic drive and control of the register wherein Figure 1 is a front elevation from the operating side, Figure 2 is a side elevation with part-section of the driving cylinder for the register, and Figure 3 is a plan view showing particularly the connection of the register with the finger by an endless band.

Figure 5 is a transverse section on the line V—V of the abutment barrel represented in Figure 4.

Figures 6 and 7 show a control cam for the rapid return of the register in its two positions of operation.

Figure 8 shows a detail of a ratchet wheel imparting a partial rotary movement to the abutment barrel.

Figure 9 shows the driving pawl of the said ratchet wheel in a disengaged position.

Figures 10 and 11 show a control cam for the partial rotary movement of the barrel in its two positions.

Figures 12 and 13 show a detail of the indexing mechanism for the partial rotary movement of the barrel.

Figure 14 is an elevation of the manual control mechanism from the operator's side.

Figure 15 is a transverse section on the line XV—XV of Figure 14.

Figure 16 is a transverse section on the line XVI—XVI of Figure 14 through the axis of the hand control wheel.

Figures 17 and 18 and 19 show the various axial positions of the axle of the hand wheel for the manual control of the rapid forward and return movements, and Figure 19 shows the same for automatic cycle operation.

Figure 26 is an example of the arrangement of a series of stops on the abutment barrel for the definition of a simple cycle.

Figures 27 and 28 show an example in front and end views of the juxtaposition of two series of stops or multiple dogs on two adjacent lines of the abutment barrel for the definition of a complex working cycle.

Figure 4:
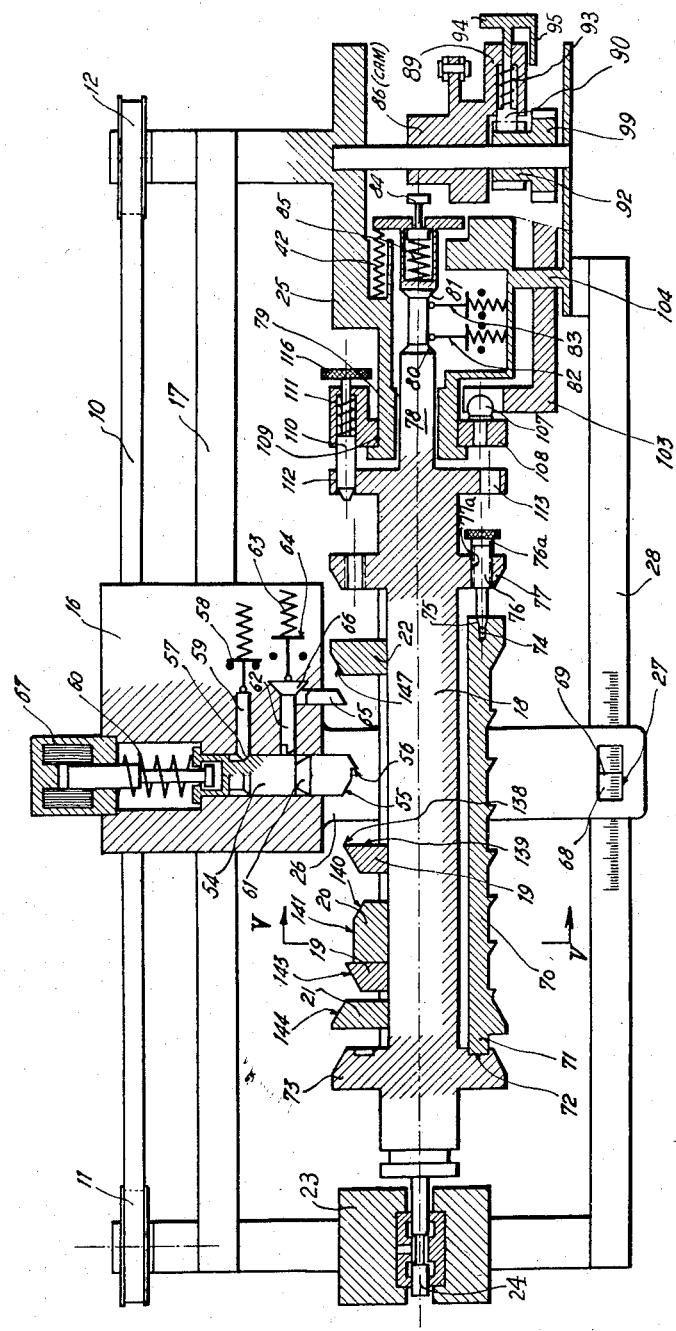
Figure 4 is a general view of a follow-up means for the hydraulic control device.

As seen in Figures 1, 2 and 3, the paper guillotine to which the hydraulic device according to the present invention is applied, is of the usual type, and the rear register performs the function usually allotted thereto in that sort of machine.

The machine comprises mainly an upright base 1 which supports a table 2 on which is placed the stack of the material to be cut. A rear register 3 slides upon the table 2 and is provided with a toothed rack 4, with its teeth pointing downwardly, which passes through a slot 2a provided along the table 2. The register 3 has an upstanding bracket 5.

A cylinder 6 is fixed below the table 2 and has a piston 7 slidable therein which at its end carries a pinion 8 in mesh with a toothed rack 9 fixedly attached to the table 2 and at the same time with the said toothed rack 4 fixedly attached to the rear register 3. Thus any movement of the piston 7 produces twice that movement of the rear register 3.

In certain cases and solely for economy of space, the pinion 8 may be replaced by a couple of differential pinions or may even be abolished, and in this case the piston 7 is attached directly to the rear register.

The upper bracket 5 of the rear register 3 is connected by an endless steel band or cable 10 passing over guide pulleys 11 to 15 mounted on the frame 1 to a slider 16 moving on a track 17 also fixed to the frame.

In certain cases which will be dealt with hereinafter the guide pulley 11 may be replaced by an assembly as illustrated in Figures 14 and 15.

Parallel to the track 17 of the slider there is positioned a function drum program bar or barrel 18 which may be provided with a certain number of removable stops, abutments, or dogs such as 19, 20, 21 and 22 fixed in appropriate grooves.

The barrel 18 is carried freely at one of its ends by a casing 23 containing a feeler or control valve 24, and at its other end by a support 25 containing a control device illustrated in Figures 4 and 6 to 13.

The slider 16 carries at the end of an arm 26 a rider 27 which moves in front of a graduated scale 28, fixed on the uprights of the frame, and extending parallel to the track 17.

This slider 16 comprises also a control mechanism illustrated in Figure 4.

Under the table, at the back of the machine, there is arranged a hydraulic supply unit comprising a reservoir 29, a pump 30 and a hydraulic distributor 31. The pipes 32, 33 and 34 connect the hydraulic supply unit to the cylinder 6 and to the casing 23 of the control valve 24.

The ensuing description will explain the operation of the hydraulic device for actuating the rear register as well as the operation of the follow-up device for the hydraulic circuit in such a way as to attain automatic operation of the whole machine.

Referring to the Figures 20 to 24, it will be seen that the pump 30 sucks in through the pipe 35 the oil contained in the reservoir 29 and discharges the same through the pipes 36 and 37, respectively, to the distributor 31 and the throttling member 38.

A safety valve 39 branched off from the conduit 36 controls the pressure necessary for the operation of the rear register. This safety valve 39 can be adjusted to the pressure desired, and a pipe 40 returns the excess oil to the reservoir.

The distributor 31 and the control valve casing 23 have the connections and appropriate positions described hereinafter for establishing the various hydraulic circuits.

The speed and the direction of movement of the piston 7 depend on the respective positions of the slide valve 41 of the distributor 31 and of the control valve 24.

The rear register 3 is connected to the piston 7 either directly or by the aid of transmissions 4, 8 and 9 enlarging or reducing the length of stroke.

Thus the rear register is operated by the piston 7, the movement of which corresponds to the direction, to the speed and to the rate of flow of the fluid of the hydraulic system described hereinafter with reference to Figures 20 to 24.

*Hydraulic system*

The pump 30 operates permanently in such a manner that the pressure and the fluid output are determined by the throttling member 38, the distributor 31, the safety valve 39 or the control valve 24 as the case may be.

The distributor 31 may be actuated in any desired manner, but in a preferred form it is operated alternately by two electromagnets as will be explained later.

The control valve 24 is operatively connected to the barrel 18, urged by the spring 42 in a preferred direction corresponding, as will be explained later, to a forward movement of the rear register to the right in Figure 2. It may likewise be operated in any manner desired, by an electromagnet, cam or fork, for example.

In the diagrams according to Figures 20 to 24 the following conventional symbols have been used:

(1) The pipes and spaces covered by double crosshatching are filled with fluid at the discharge pressure of the pump 30.

(2) The pipes and spaces covered by simple cross-hatching are filled with fluid at the pressure regulated by the control valve 24.

(3) The pipes and spaces covered by dots are filled with fluid at atmospheric pressure.

Figure 20:
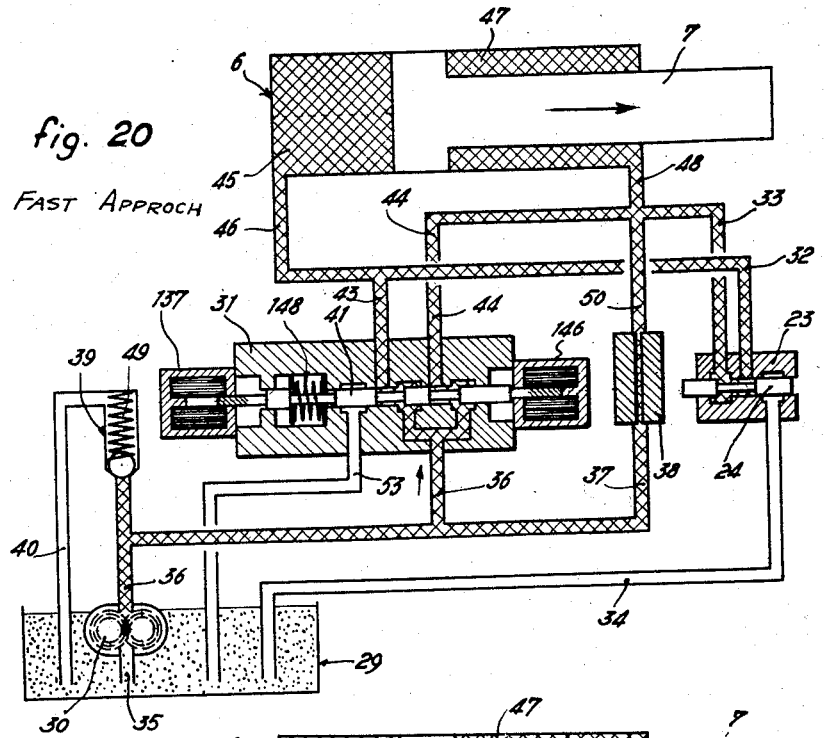
Figures 20, 21, 22, 23 and 24 are diagrams of the hydraulic circuits for defining all the movements of the register.

In order to attain a rapid forward movement of the piston 7 in the direction from left to right corresponding to the forward movement of the rear register, the distributor 31 and the control valve 24 are in the position indicated in Figure 20.

In the distributor 31 the duct 36 is in communication with the ducts 43 and 44, and the control valve 24 connects the ducts 32 and 33 to one another.

The whole output of the pump 30 arriving at the distributor 31 through the pipe 36 supplies the large chamber 45 through the pipes 43 and 46, and the small chamber 47 is in communication with the large chamber 45 through the pipes 48, 44, 43 and 46. The uniform pressure in the two chambers is accordingly identical, but as the piston has a greater surface in the large chamber 45 than in the small chamber 47, the resulting force on the piston 7 displaces the same towards the right. In its movement, the piston 7 discharges the fluid contained in the small chamber 47 through the pipes 48, 44, 43 and 46 into the large chamber 45.

The safety valve 39 being biassed by a calibrated spring 49 in such a maner as to keep the duct 36 closed at the normal pressure of the pump, the whole output of the pump 30 is used for supplying the cylinder 6 in a closed circuit.

When the pressure in the duct 36 exceeds the normal control valve, the safety valve 39 opens and allows the excess output to return to the reservoir 29 through the pipe 40.

In the actuation of the rear register it is always necessary to displace this register rapidly between the cuts, but the speed has to be reduced when approaching the end of the stroke in order to prevent any sliding of the material to be cut beyond the accurate point at which the cut is to be made.

Figure 21:
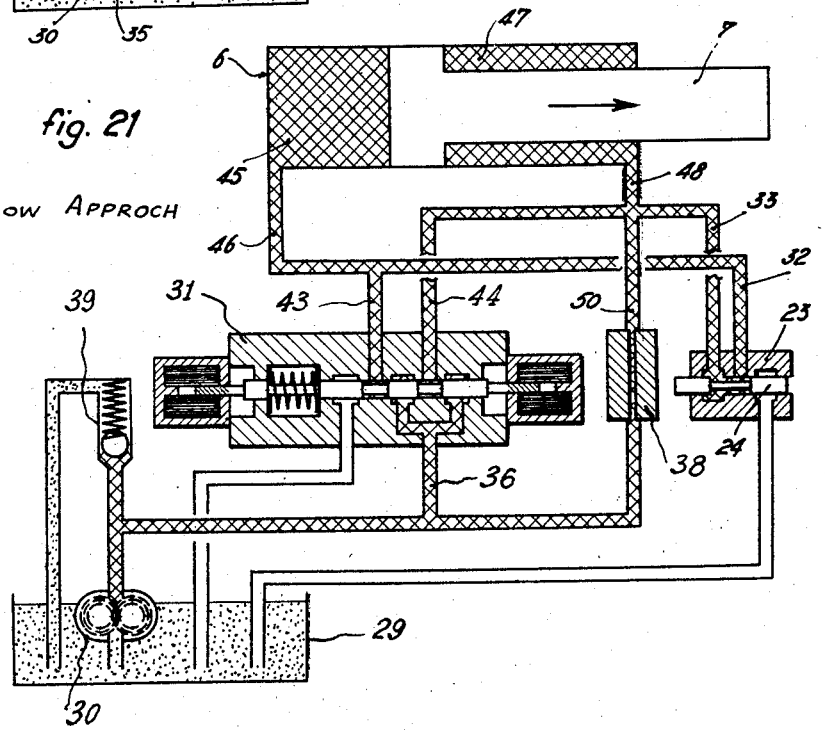

This reduction of speed is attained by interrupting communication between the duct 36 and the pipes 43 and 44 in the distributor 31 (Figure 21).

The pump can then supply the upper part of the circuit only through the throttle point 38.

This abrupt throttling would produce a strong increase in pressure in the lower part of the circuit if this pressure were not relieved by the safety valve 39.

The excess output of the pump 30 cannot pass through the throttle point 38 and therefore returns to the reservoir 29 after passing through the safety valve 39.

The small mass flow of oil passing through the throttle point 38 supplies the large chamber 45 of the cylinder through the pipes 50 and 33, then through the control valve 24 and the pipes 32 and 46.

The small chamber 47 is in communication with the large chamber 45 through the ducts 48 and 33, the control valve 24, and the ducts 32 and 46. The unitary pressure in the two chambers is equal, but the resulting force on the piston 7 pushes the same to the right, the oil contained in the small chamber 47 being discharged through the pipes 48, 33, 32 and 46 into the large chamber 45.

In order to stop the forward movement of the register 3 one may:

(1) Displace in any desired manner the control valve 24 in order to interrupt the communication of the pipe 32 with the pipe 33. The total output of the pump 30 is returned to the reservoir 29 after having passed through the safety valve 39.

Figure 22:
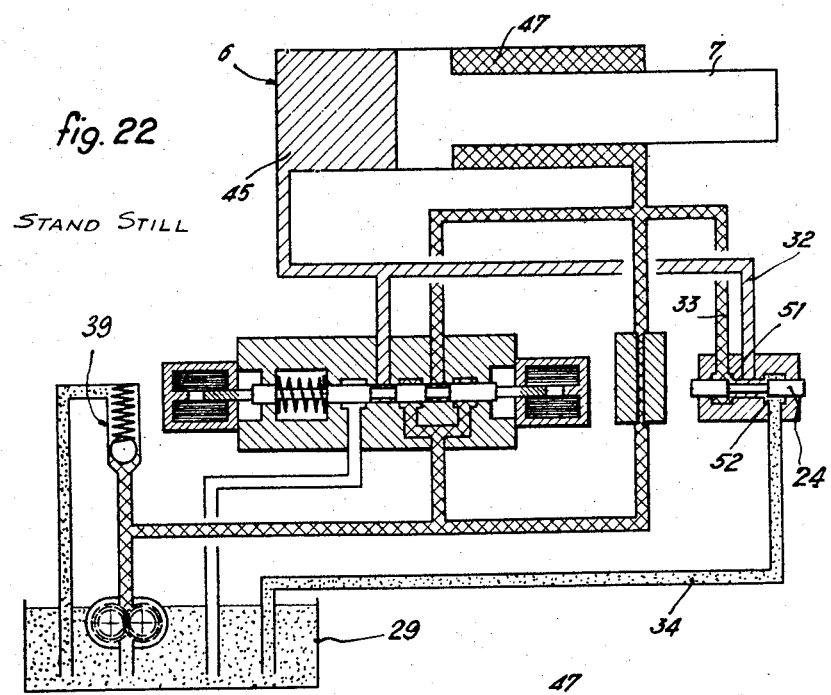

(2) Displace in the preferred way illustrated in Figure 22 the control valve 24 in such a manner that it partly interrupts the communication between the ducts 33 and 32, and partly establishes communication between the ducts 32 and 34, in such a manner that the throttling points 51 and 52 thus set up by the edges of the valve 24 permits the passage of the output from the throttling member 38 through the valve 24 so as to return to the reservoir 29 through the pipe 34.

At that moment the chambers 45 and 47 are no longer supplied and the movement of the piston 7 and of the rear register 3 is stopped, the fluid circuit being in equilibrium.

An advantageous embodiment consists in stopping the register 3 by connecting it mechanically with the control valve 24 in arrested position. This connection may be established in such a way that the register in its forward movement always carries with it the control valve 24 in the direction of closing the throttle point 51 and opening the throttle point 52.

Thus the register advances slowly up to the moment when the position of the control valve 24 permits the return to the reservoir through the duct 34 of the total output of the throttling member 38 from the throttling points 51 and 52. The variation of the cross section area of the throttling points 51 and 52 being brought about by the forward movement of the register, this variation takes place progressively and the speed diminishes in a regular manner up to a complete standstill (Figure 22). This way of proceeding prevents the register from losing contact with the material to be cut.

As soon as the rear register has terminated its forward movement, it has to be restored to its starting point so as to be able to begin a new cycle of cuts.

For certain operations it is desirable to be able to make alternate slow and rapid forward movements and slow and rapid return movements of the register in a cycle.

Figure 23:
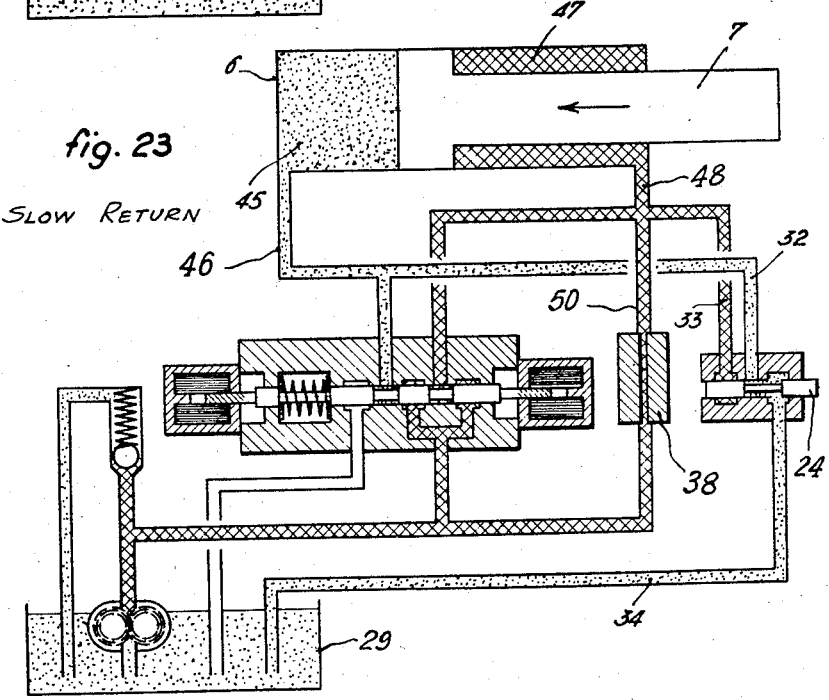

The slow return of the register is effected (as shown in Figure 23) by actuating the control valve 24 in such a manner that the duct 32 is connected to the duct 34.

The output passing through the throttling member 38 supplies the small chamber 47 of the cylinder 6 through the pipes 50 and 48, while the large chamber 45 is put into communication with the reservoir 29 through the pipes 46 and 32, the valve 24 and the duct 34. The pressure in the large chamber 45 is accordingly equal to atmospheric pressure.

The piston 7 pushed by the oil at higher pressure in the small chamber 47 moves towards the left discharging the oil from the large chamber 45 which returns to the reservoir.

Figure 24:
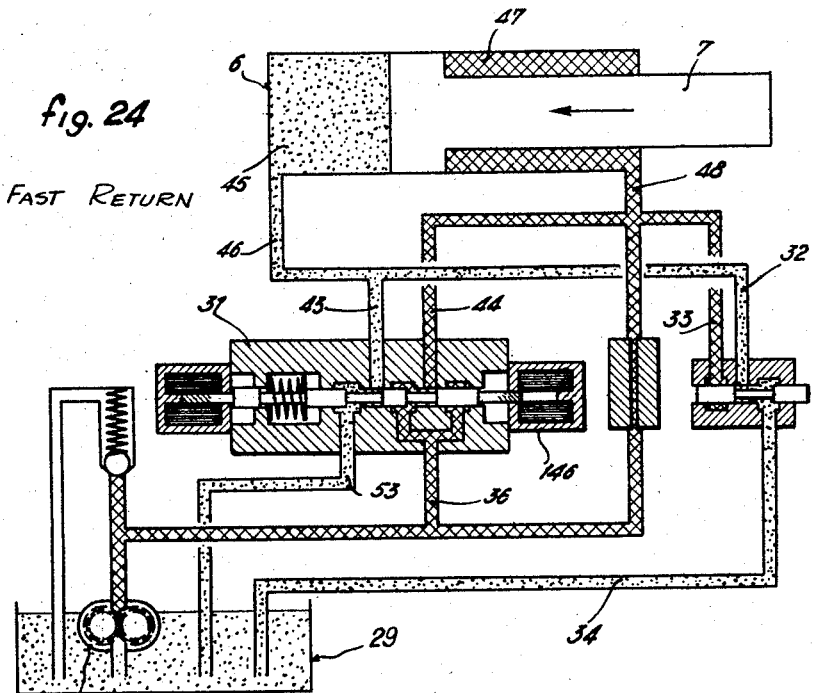

A rapid rate of return of the register may be attained by actuating the distributor 31 in such a manner that the ducts 36 and 44 and the ducts 43 and 53 are connected with one another, respectively, as shown in Figure 24.

The total output of the pump 30 supplies the small chamber 47 of the cylinder 6 through the pipes 44 and 48, while the oil from the large chamber 45 returns to the reservoir 29 through the pipes 46, 43 and 53.

When the rapid return movement comes to a standstill (Figure 22) the pressure rise is taken up by the safety valve 39.

The means described hereinabove permit to obtain an automatic control of the rear register by using a follow-up device actuated in response to the position of the rear register and placing the slide valve 41 of the distributor 31 and the control valve 24 into the desired position.

*Follow-up device*

With reference to Figures 1, 2 and 3 it will be seen that the slider 16 carried along by the band 10 connected to the rear register 3 by the bracket 5 and passing over the guide pulleys 11 to 15 can move on the track 17 fixed to the frame 1 of the machine.

As shown in Figure 4 the slider 16 carries a vertically movable finger 54 having at its lower end a chamfer 55 and a notch 56 with a vertical face; on the flank of the finger 54 and on its upper portion a chamfer 57 is provided for operating a micro-switch 58 by the intermediary of a pusher 59.

The finger 54, which is biased to its lower position by a spring 60, has also a locking notch 61 into which a latch 62 can engage under the bias of a spring 63, said latch actuating a micro-switch 64.

A push rod 65 mounted in a vertical position on the underside of the slider 16 is provided for disengaging the latch 62 from the notch 61 by the action of a chamfer 66 arranged on the latch 62.

A solenoid 67 carried by the slider 16 permits to draw the finger 54 upward.

The slider 16 comprises as stated hereinabove, an arm 26 carrying at its lower portion a rider or viewer 27 provided with a magnifying lens 68 in which a marker line 69 is engraved in order to facilitate reading of the graduations of the scale 28.

The finger 54 and the pusher 65 move opposite a series of abutments carried by the barrel 18.

The barrel 18 is supported on the left hand side by a bearing 23 constituting a casing for the control valve 24 of the hydraulic circuit. The control valve 24 is operatively connected to the abutment barrel 18 for movement simultaneously therewith.

The abutment barrel 18 may comprise numerous combinations of abutments, say eight in the embodiment illustrated (see Figure 5).

These combinations may be formed by adjustable abutments positioned in grooves provided for this purpose, or they may be constituted by multiple dogs such as 70 and comprise the number and kind of abutments required for a predetermined program. These dogs can be quickly replaced by other dogs having different combinations provided on them. An example of means for fixing these dogs in position is given in Figure 4. The dog 70 terminates at one end in a finger 71 engaging in a groove 72 cut into a collar 73 carried by the barrel 18.

The other end of the dog 70 is pierced with a hole 74 into which engages the point 75 of a screw bolt 76 having a knurled head 76a screwed into a hole 77a in the collar 77 of the abutment barrel.

The collars 73 and 77 have accordingly a groove 72 for the finger 71 and a hole 77a for the screw 76, respectively, at each position of a line of abutments, e. g. eight in the embodiment illustrated.

The abutment barrel 18 is carried on the right hand side by a stub 78 sliding freely in a bearing 79 of the support 25, and this stub 78 has on its extension two chamfers 80 and 81 for actuating two micro-switches 82 and 83. A spring 42 biases the barrel 18 and the control valve 24 constantly in a preferred direction towards the right, and a pusher 84 held by a spring 85 which is stronger than the spring 42 can limit the stroke of the barrel 18 by abutting on a cam 86.

This cam 86 can occupy alternately two positions under the control of an electro-magnet 87 or of a spring 88 (Figures 6 and 7).

The cam 86 carries on an extension 89, a pawl 90 engaging the teeth 91 of a ratchet wheel 92. A spring 93 biases the pawl 90 into the teeth 91. By pulling on the knurled knob 94 integral with the pawl 90 and by rotating it until a finger 95 engages in a notch 96 of the support 89, the pawl 90 is held disengaged from the teeth 91 of the ratchet wheel 92 (Figures 8 and 9).

A latch 97 biased by a spring 98 prevents any reverse rotation of the ratchet wheel 92.

A star-shaped cam 99 (Figures 4, 10 and 11) fixedly connected to the ratchet wheel 92 actuates by the intermediary of the cam faces 100 and 101 and of the roller 102 the rocker 103 oscillating about the axle 104.

A spring 105 maintains the roller 102 in contact with the star-shaped cam 99.

The rocker 103 ends in a fork 106. A finger 107 integral with a collar 108 engages the fork 106. This collar 108 can turn, as shown in Figure 4, on a projection 109 of the support 25, and it carries a finger 110 biased by a spring 111.

The finger 110 engages into a hole 112 in a collar 113 integral with the abutments barrel 18. The collar 113 comprises as many holes 112 as is the possible number of combinations of multiple dogs 70 to be mounted on the barrel 18, say eight in the embodiment described. These holes 112 are drilled in such a manner that a line of abutments is disposed opposite the finger 54 when the roller 102 is on an elevated point 114 of the cam 99. When the roller 102 is on an adjacent low point 115 of the cam 99, the line of abutment adjacent to the preceding one is opposite the finger 54.

A knurled knob 116 integral with the finger 110 permits the disengagement thereof from the collar 113 in order to allow the rotation of the collar for the purpose of positioning any desired line of abutments opposite the finger 54.

Figures 14 and 5 show a part view of the machine provided with a manual control device. As can be seen in the drawing the guide pulley 11 for the band 10 may be coupled by a conical friction clutch 11a with a worm wheel 117 by the action of a spring 118. An electro-magnet 119 declutches the worm wheel 117 from the pulley 11 when energised.

A worm 120 meshes with the worm wheel 117 and is restrained from moving axially with respect to the abutments barrel 18 by means of a work 121.

A splined shaft 122 held axially in a bearing 123 integral with the frame 1 carries along the worm 120 in rotation, but leaves it free for translational movement.

The splined shaft 122 can be rotated by a bevel pinion 124 carried by the slide 16 and slidable on the shaft 122.

The slide 16 supports also another bevel pinion 125 driven rotationally by a hand wheel 126. The shaft 127 of the hand wheel 126 is freely slidable axially with respect to the bevel pinion 125, but keyed thereto for rotation. The shaft 127 has a chamfer 128 for controlling a micro-switch 129, and a groove 130 for controlling a micro-switch 131 by means of the chamfers 132 and 133 thereof. A groove 134 of smaller depth than the groove 130 may be moved in front of the microswitch 131 by displacing the hand wheel towards the right.

A ball 135 biased by a spring 136 determines the axial positions of the shaft 127 by engaging in the groove 130 or in the groove 134.

The operation of the follow-up device is as follows:

*(1) Description of a simple working cycle*

As a first prerequisite, a rapid forward rate must be imparted to the rear register 3 between two cuts.

This rapid forward movement is effected by positioning the slide valve 41 of the distributor 31 as described heerinabove with reference to Figure 20.

The operation of the slide valve 41 in the distributor 31 is effected in the following manner, with reference to Figure 4 and to the electric wiring diagram Figure 25.

Between two stops the finger 54 is free and biased by the spring 60, and it finds itself in the lower position while the micro-switch 58 is in the closed position.

The abutments barrel 18, biased by the spring 42, controls the micro-switch 82 by the chamfer 80, and closes the circuit. The solenoid 137 sets the slide valve 41 of the distributor 31 into the position for rapid forward feed (Figure 20).

When the material to be cut arrives in a position near to a desired stop position, it is necessary to slow down the forward speed of the register in such a manner that, carried along by its own inertia, the stack does not overshoot its normal position for the cut, losing contact with the register.

An abutment 19 is positioned for example in order to effect a stop at the desired point. When the chamfer 55 of the finger 54 comes into contact with the ridge 138 of the abutment 19, the reaction of the ridge 138 on the chamfer 55 lifts the finger 54. The chamfer 57 actuates the pusher 59 which controls the micro-switch 58. The circuit being thus opened, the solenoid 137 is no longer energised, and a spring 148 restores the slide valve 41 of the distributor 31 to the neutral position. The supply can then take place only through the throttling member 38, and the register moves forward at a low speed (see Figure 21).

Thus a certain course is set up between the end of the rapid forward movement and the complete stoppage of the register.

If the material to be cut has a very low coefficient of friction, it is necessary to have a longer course between the end of the rapid forward feed and the complete stoppage of the register.

This longer course is obtained by placing before the stopping abutment 19 a cam 20 for slowing down the register over an appropriate length, the chamfer 140 of the cam 20 acting to raise the finger 54 which controls the opening of the micro-switch 58.

This position of the finger 54 is maintained during the whole of its course on the upper face 141 of the cam 20, and the feed takes place at a low speed. When the face 56 of the finger 54 comes into contact with the flank 139 of the adjacent abutment 19, the barrel 18 and the control valve 24 are carried along towards the left up to the moment when the control valve 24 stops the forward feed in the same manner as described hereinabove (Figure 22).

When the stack of material to be cut is arrested in the position for the cut, the cutting mechanism of the paper guillotine (not described in this specification) may be actuated either manually or automatically.

After the cut has been completed the return movement of the knife automatically closes a switch 142 which energises the solenoid 67 to raise the finger 54 and disengage it from the abutment 19. The abutments barrel 18 moves towards the right under the action of the spring 42, carrying along the control valve 24 which permits the slow feed of the rear register 3 and the slow movement of the slider 16 (Figure 21).

Figure 25:
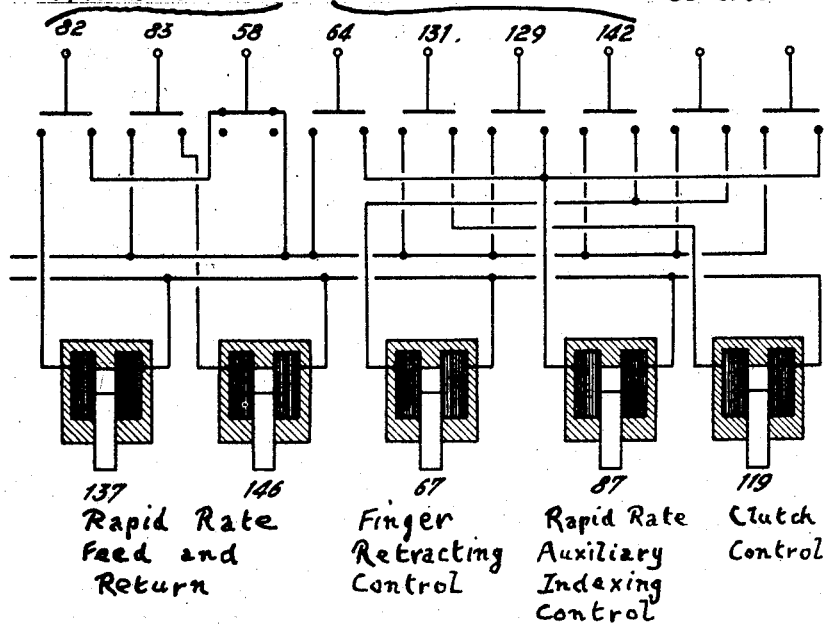
Figure 25 is a wiring diagram of the electrical circuits of all the electromagnets.

The micro-switch 82, actuated by the chamfer 80, closes and enables thus the solenoid 137 to be energised (Figure 25). When the end of the finger 54 leaves the upper face 143 of the abutment 19, the finger 54 drops under the bias of the spring 60, and the micro-switch 58 closes the circuit of the solenoid 137, actuating the slide valve 41 of the distributor 31.

The register 3 moves consequently at a rapid rate of feed (Figures 20 and 25).

It should be noted that the register begins its forward movement at a slow rate. This peculiarity permits the finger 54 to come to a standstill with every safety on an abutment very close to that which it has just left; this would not have been possible if the register had started off immediately at a high rate of feed.

In fact it needs a certain time for the finger 54 to descend. This time, although it is very short, allows a substantial displacement of the slider 16 if the feed begins at a high rate. In such conditions the finger 54 would invariably pass to the next adjacent abutment before descending.

The operation of stopping on an abutment and of advancing after a cut repeats itself until after the last cut provided in the program.

At this moment it is necessary to restore the rear register to its starting point.

To this effect, when the finger 54 has cleared the last abutment, it comes into contact with a cam 21, which by the reaction of the chamfers 144 and 55, placed respectively on the cam 21 and on the finger 54, determines the raising of the finger.

In the first rising movement of the finger 54, the micro-switch 58 opens the circuit of the solenoid 137. The feed takes place at a low speed (Figure 21) and the finger 54, always pushed by the chamfers 144 and 55 rises up to the moment when the notch 61 comes into line with the latch 62. The latch, biased by the spring 63, drops into the notch, and the micro-switch 64 closes the circuit of the solenoid 87.

The solenoid 87 rotates the cam 86 (Figures 6 and 7) so that the end 145 pushes the barrel 18 to the left in Figure 4 by the intermediary of the pusher 84 and of the spring 85. In order to perform a working cycle, the finger 90 has to be disengaged from the teeth 91 (see Figures 8 and 9).

The barrel 18 carries along the control valve 24 into a position for slow return (Figure 23) and, when the chamfer 81 operates the micro-switch 83, the latter closes and energises the solenoid 146 which brings the slide valve 41 of the distributor 31 into the position for rapid return of the register (Figure 24).

When the push rod 65 comes into contact with a cam 22 arranged on the barrel 18, the chamfer 147 of the cam 22 raises the push rod 65 which by the intermediary of the chamfer 66 disengages the latch 62 from the notch 61 of the finger 54.

The micro-switch 64 opens, and deenergizes the solenoid 87.

The cam 86 returns into a disengaged position under the action of the spring 88, and the abutments barrel 18 moves towards the right under the action of the spring 42 while the finger 54 has returned to its lower position under the action of the spring 60.

The distributor 31 is accordingly connected in such a manner as to effect a rapid forward feed (Figure 20).

The register 3 moves forward right up to the moment when the finger 54 meets an abutment 19 which determines the stopping in accordance with the procedure described hereinbefore.

This manner of operation gives accordingly the possibility of carrying out a series of successive cuts the value of which is represented by the abutments positioned in advance without any need for the operator to worry about the control of the rear register. The successive movements of the latter have been rendered automatic.

After the last cut the register returns automatically to the starting position, ready to perform a new cycle of operations.

(2) *Description of a complex operating cycle*

It it is desired to apply the simple working cycle described hereinabove for cutting the four sides of a rectangular format, it suffices to dispose correctly on one of the grooves of the barrel four abutments as defined by the marker 19.

The operator rotates the stack 180° after the first cut, 90° after the sceond cut and again 180° after the third cut, each time bringing the stack to the respective position, defined by the successive abuments.

In fact, taking for example the cutting of a format of 650 by 1000 millimetres, the abutments are positioned at the points 1020—1000—670 and 650 (Figure 26), and the successive cuts are performed in this sequence:

(1) The register is in the position 1020 for the first cut.

(2) The operator pushes the stack into abutment with the register and operates the first cut.

(3) After the first cut, the register moves automatically into the position 1000.

(4) The operator rotates the stack 180°, brings it again into abutment with the register, and performs the second cut.

(5) After the second cut the register moves automatically into the position 670.

(6) The operator rotates the stack this time only 90° in order to bring it again into abutment with the register, and the third cut is performed.

(7) After the third cut the register moves automatically into the position 650 for the fourth cut.

(8) The operator rotates the stack again 180°. After the fourth cut the register returns automatically into the position 1020.

It will be seen accordingly that for cutting four faces of the format the operator has to turn the pile twice 180° and once 90°.

In order to reduce the fatigue of the operator and the loss of time in handling, it would be desirable to make the pile turn 90° only between cuts. For this purpose it would be nceessary to carry out the cuts in the sequence 1020—670—1000 and 650.

In order to obtain this sequence it suffices to position the abutments 1020 and 670 on the line A of the barrel (Figures 27 and 28) and the abutments 1000 and 650 on the adjacent line B in such a manner that the line A corresponds to the position of the fork represented in Figures 10 and 12, and the line B corresponds to the position represented in Figures 11 and 13, these figures showing the details of the follow-up device.

Automatic return cams such as 21 are positioned ahead of the lines A and B while cams 22 for arresting of the return movement are positioned behind them.

The knurled knob 94 is turned, the finger 95 is disengaged from the groove 96, and the pawl 90 engages a tooth 91 of the ratchet wheel 92 (Figure 8).

The register is stopped at the position 1020 for the first cut, the finger 54 being hooked on the stop 1020—line A (Figure 12).

After the first cut, the finger 54 will move to the position 670 in the manner described hereinabove in the definition of the simple working cycle, and the operator rotates the stack 90°.

After the second cut in the position 670 the finger 54 comes into contact with the adjacent cam 21 which by the intermediary of the chamfers 144 and 55 (Figure 4) permits the latch 62 to drop into the groove 61, thus energizing the solenoid 87 (Figures 6 and 7).

The solenoid 87 makes the cam 86 turn which effects the rapid return in the manner described hereinabove. The pawl 90 which is fixedly connected to the cam 86 carries along the ratchet wheel 92 and makes it turn one pitch division (Figure 8). The cam 99 fixedly connected to the ratchet wheel 92 offers a low point 115 opposite the roller 102, and the spring 105 pivots the rocker 103 rotating the disc 108 by means of the fork 106 and of the finger 107 (Figures 10, 11, 12 and 13).

The disc 108 which is fixedly connected to the barrel 18 by the finger 110 engaging in a hole 112 of the collar 113 rotates the barrel and brings the line B of abutments opposite the finger 54 (Figure 13).

When the push rod 65 meets the cam 22 on the line B for stopping the return movement of the register, the solenoid 87 is deenergized and the spring 88 restores the cam 86 to a disengaged position (Figure 6).

The disengagement of the cam 86 from the pusher 84 releases the barrel 18 which under the action of the spring 42 effects the rapid forward feed of the register and of the finger 54 right up to the abutment 1000.

The pawl 90 is disengaged from the tooth 91 of the ratchet wheel 92 and engages the next one, this wheel being held by the latch 97 under the action of the spring 98.

The operator rotates the stack 90° before proceeding to the third cut.

After the third cut the finger 54 comes to a stop on the abutment 650.

The operator rotates the pile again 90° and makes the fourth cut.

Finally, after this last cut, the finger 54 meets a return cam 21, which energizes the solenoid 87 in the manner described hereinabove.

As before the energizing of the solenoid 87 rotates the cam 86 so as to effect the rapid return, and the pawl 90 makes the ratchet wheel 92 turn one pitch division. The cam 99 pushes the roller 102 by means of the chamfer 101 to a high position. The rocker 103 pivots on its shaft 104 and carries the abutments barrel 18 along to position the line A of abutments opposite the finger 54 (Figure 12).

When the finger 54 comes into contact with a cam 22 on the line A, it deenergizes the solenoid 87. The cam 86 disengages itself, and the pawl 90 jumps to the next tooth 91 of the wheel 92.

The barrel thus released effects the forward feed of the register 3 and of the slider 16. The finger 54 moves forward and comes to a stop against the abutment 1020.

The register is now in the operative position for a first cut of the next stack of material.

(3) Operation of the manual control

For cutting strips or standard formats, multiple dog programs may be provided comprising as stated the combinations of the various abutments or cams required for the work to be carried out. However, for certain special operations it remains important to be able to regulate manually the position of the register at each stroke or to adjust manually the position of the register and to place an abutment at the point required.

For this kind of work the machine is provided with a device illustrated in the Figures 14, 15 and 16, for disconnecting the automatic cycle and moving the register 3 and slider 16 by hand at a slow or rapid rate of feed or return.

When the hand wheel 126 is in the position illustrated in Figure 16, the micro-switch 131 is open to deenergize solenoid 119. The spring 118 keeps the guide roller 11 of the band 10 engaged with the worm wheel 117 by the friction clutch 11a.

With the register stopped the slide valve 41 of the distributor 31 being in a neutral position owing to the action of the spring 148, and the control valve 24 being in the stop position at which the hydraulic circuit is in equilibrium (Figure 22), the guide pulley 11 of the band 10 is fixed and so is the worm wheel 117 which is clutched to it.

The worm 120 is coupled by the fork 121 with the abutments barrel 18 and the control valve 24.

Thus a displacement of the worm 120 entails a corresponding displacement of the control valve 24.

By turning the hand wheel 126 in one sense or the other, the worm 120 is rotated by the pair of bevel gears 124—125 and the shaft 122.

When the worm 120 reaches the fixed worm wheel 117, it moves axially and carries along the control valve 24 into a position effecting the slow movement of the register (Figures 21 and 23) in the direction corresponding to the sense of rotation of the hand wheel 126.

As long as the rotation of the hand wheel 126 is continued, the worm 120 continues its axial displacement, and so does the valve 24 which controls the movement.

When the rotation of the hand wheel 126 is interrupted, the worm wheel 117 driven by the pulley 11 and the band 10 attached to the register moves the worm 120 and the control valve 24 until the latter reaches the position of hydraulic equilibrium.

The displacement of the control valve necessary for effecting a slow movement of the register being very small, it suffices if the operator stops the rotation of the hand wheel 126 at the moment when the pointer 69 of the magnifying lens 68 is in line with the desired position on the scale 28.

Thus the operator can adjust the register manually and with accuracy to any desired stop position by advancing or retracting it by the hand wheel.

In the case when two desired stop positions are spaced apart quite considerably it would be tedious to effect the total movement of the register by turning the hand wheel.

With the hand wheel 126 pushed inward (Figure 17), the chamfer 133 of the groove 130 energizes the solenoid 119 by closing the micro-switch 131 whereby the worm wheel 117 of the pulley 11 is released while the chamfer 128 energizes the solenoid 87 by closing the micro-switch 129.

The solenoid 87 effects the rapid return as described hereinabove by rotating the cam 86 until its corner 145 pushes the barrel 18 to close the switch 83 and energize the solenoid 146. As soon as the pressure on the hand wheel 126 is relaxed, the ball 135 biased by the spring 136 and bearing on the chamfer 133 restores the hand wheel 126 to its initial position at which the register is stopped (Figure 16).

With the hand wheel 126 pulled slightly outward (Figure 18), the chamfer 132 of the groove 130 energizes the solenoid 119 by closing the microswitch 131 which releases the worm wheel 117 from the pulley 11. The worm 120 thus released axially allows the barrel 18, which is loaded by the spring 42, to move the valve 24 into the position effecting a rapid forward feed by closing the switch 82 and energizing the solenoid 137 (Figure 20).

When the hand wheel 126 is released again the ball 135 biased by the spring 136 restores the hand wheel to its initial position of hydraulic equilibrium.

Thus the operator may effect the rapid forward or return movement of the register 3 and the slider 16 by pulling or pushing slightly the hand wheel, or the slow forward or return movement of the slider 16 and the register 3 by turning the hand wheel. For rapid movement the hand wheel is moved in the same direction as the register, and for slow movement in the same direction as the slider.

In the case of cuts performed in automatic cycles, it is necessary to keep the abutments barrel free to move axially by abolishing the connection of the pulley 11 with the worm wheel 117.

For this purpose the hand wheel is pulled out all the way until the groove 134 comes into line with the ball 135 and the micro-switch 131 (Figure 19). This groove being less deep than the groove 130, it keeps the micro-switch 131 in a position energizing the solenoid 119.

Finally, in case the immediate stopping of the rear register in the course of an automatic working cycle is required, the hand wheel 126 is pushed in so as to restore the same to its initial position.

It will be readily appreciated from the foregoing description of the invention, in its particular application to driving, and controlling the movements of, a paper guillotine register, that the hydraulic circuit, follow-up mechanism and manual control system of the invention are susceptible of being applied individually or in their entirety to any machine having a moving part, the movements of which must be controlled for rapid rate or slow rate and accurately stopped at predetermined positions. Thus the scope and spirit of the invention includes all machines and apparatus falling within the ambit of the appended claims, without any limitation to the specific example herein described.

What is claimed is:

1. A hydraulic drive and control device comprising a source of fluid at constant pressure; a fluid circuit including a pressure branch connected to the source and a return branch at low pressure; throttling means in the pressure branch restricting the rate of fluid flow therethrough; a fluid motor having a low power side permanently connected to the pressure branch downstream of the throttling means and a high power side; control means having a first connection to the low power side of the motor, a second connection to the high power side, and a third connection to the return branch, by-pass means with connections respectively to the pressure branch upstream and downstream of the throttling means, to the return branch, and to the high power side of the motor; and valve means for controlling the connections of the by-pass means.

2. A hydraulic device as in claim 1 wherein the valve means comprise a slide-valve having three operative positions at which, respectively, in the first position the pressure branch upstream of the throttling means is connected to the high power side of the motor and to the pressure branch downstream of the throttling means for direct supply of fluid from the source to both sides of the motor, in the second position the by-pass means is closed to fluid flow therethrough, and in the third position the pressure branch upstream of the throttling means is connected to the pressure branch downstream of the throttling means for direct supply of fluid to the low power side of the motor and the high power side is connected to the return branch.

3. A hydraulic device as in claim 2 comprising a spring biassing the slide-valve into the second position, and means for actuating it into each of the other two positions.

4. A hydraulic drive and control device comprising a source of fluid at constant pressure; a fluid circuit including a pressure branch connected to the source and a return branch at low pressure; throttling means in the pressure branch restricting the rate of fluid therethrough; a fluid motor having a low power side permanently connected to the pressure branch downstream of the throttling means and a high power side; and control means having a first connection to the low power side of the motor, a second connection to the high power side, and a third connection to the return branch, said control means comprising a feeler valve having three operative positions at which, respectively, in the first position the first and second connections thereof are in communication to connect the pressure branch to both sides of the motor, in the second position the first, second and third connections thereof are in communication for metered flow of fluid therethrough to both sides of the motor and to the return branch, and in the third position the first connection is closed and the second and third connections are in communication to connect the high power side of the motor to the return branch.

5. A hydraulic device as in claim 4 further comprising a mechanical connection between the motor and the feeler valve, and means biassing the feeler valve toward the first position.

6. A hydraulic device as in claim 4 further comprising by-pass means with connections respectively to the pressure branch upstream and downstream of the throttling means, to the return branch, and to the high power side of the motor; and valve means for controlling the connections of the by-pass means.

7. A hydraulic device as in claim 6 wherein the valve means comprise a slide-valve having three operative positions at which, respectively, in the first position the pressure branch upstream of the throttling means is connected to the high power side of the motor and to the pressure branch downstream of the throttling means for direct supply of fluid from the source to both sides of the motor, in the second position the by-pass means is closed to fluid flow therethrough, and in the third position the pressure branch upstream of the throttling means is connected to the pressure branch downstream of the throttling means for direct supply of fluid to the low power side of the motor and the high power side is connected to the return branch.

8. A hydraulic device as in claim 6 comprising a spring biassing the slide-valve into the second position, and means for actuating it into each of the other two positions.

9. A hydraulic device as in claim 4 further comprising a mechanical connection between the motor and the feeler valve; means biassing the feeler valve toward the third position, by-pass means with connections respectively to the pressure branch upstream and downstream of the throttling means, to the return branch, and to the high power side of the motor; and valve means for controlling the connections of the by-pass means.

10. A hydraulic device as in claim 9 wherein the valve means comprise a slide-valve having three operative positions at which, respectively, in the first position the pressure branch upstream of the throttling means is connected to the high power side of the motor and to the pressure branch downstream of the throttling means for direct supply of fluid from the source to both sides of the motor, in the second position the by-pass means is closed to fluid flow therethrough, and in the third position the pressure branch upstream of the throttling means is connected to the pressure branch downstream of the throttling means for direct supply of fluid to the low power side of the motor and the high power side is connected to the return branch.

11. A hydraulic device as in claim 10 comprising a spring biassing the slide-valve into the second position, and means for actuating it into each of the other two positions.

12. A hydraulic drive and control device comprising a cylinder; a differential piston in the cylinder defining therein a large, high power chamber and a small, low power chamber; a constant output pump; a supply branch connected to the pump; a metered circuit connecting the supply branch to both chambers; a free circuit connecting the supply branch to both chambers; a return branch connecting each circuit to exhaust; first control means inserted in the metered circuit and connected to the free circuit for determining the direction of movement of the piston between the two chambers and for stopping the piston in adjusted position; and second control means inserted in the free circuit for selectively opening the free circuit to by-pass the metered circuit, closing the free circuit, and connecting the free circuit to the small chamber and the return branch to the large chamber.

13. A hydraulic device as in claim 12 further comprising a follow-up mechanism connecting the piston to the first control means for actuating the latter in dependence on the position of the former.

14. A hydraulic device as in claim 13 wherein the first control means comprises a feeler valve; and the follow-up mechanism comprises an indexing finger connected to the piston and movable along a predetermined path; a function drum positioned along said path; means incorporated in the drum for selectively positioning thereon a desired number of stops extending into said path; means supporting the drum for limited movement in either direction parallel to said path; means biassing the drum in a preferred direction of movement; and a mechanical connection between the drum and feeler valve for joint movement.

15. A hydraulic device as in claim 14 comprising a slide movable along said path and supporting the finger for movement toward and away from the drum; means for retracting the finger from a normal position in said path; a latch for retaining the finger in retracted position; and means extending from the slide into said path for releasing the latch.

16. A hydraulic device as in claim 15 further comprising an electrical control circuit; electromagnetic means for actuating the second control means; a pair of normally open switches inserted in the control circuit and actuatable alternately by the drum to energize the electromagnetic means and actuate the second control means to connect the free circuit selectively either to both cylinder chambers or only to the small chamber with the large chamber connected to the return branch; a normally closed switch inserted in the control circuit in series with one of the pair of switches; and means on the slide for opening the normally closed switch with the finger retracted.

17. A hydraulic device as in claim 16 further comprising means limiting movement of the drum in said preferred direction selectively at two end positions; an electromagnet indexing the limiting means at said two positions; a further normally open switch inserted in the control circuit; and switch actuating means connecting the latch to the further switch to energize the electromagnet with the finger retained by the latch.

18. A hydraulic drive and control device comprising a fluid circuit; a constant output pump in the circuit; a motor in the circuit having a work stroke and a return stroke; a throttled branch in the circuit connected to the motor to determine slow rate movement of the motor; a control valve in the circuit to determine direction of movement of the motor and equilibrium of the circuit for stopped condition; a by-pass around the throttled branch to determine rapid rate movement of the motor, and a follow-up mechanism connecting the motor to the control valve; and manual control means in the follow-up mechanism operative selectively with the circuit in equilibrium to actuate the control valve for monitored slow rate movement of the motor in either direction and to actuate the control valve and the by-pass for monitored rapid rate movement in either direction.

19. A hydraulic device as in claim 18 comprising a hand wheel having a disengaged position, a slow rate position, and rapid rate positions respectively for work and return strokes; a clutch and transmission coupling the hand wheel to the follow-up mechanism with the circuit in equilibrium and the hand wheel in slow rate position; and electromagnetic means controlling the by-pass with the hand wheel in rapid rate positions.

20. In a machine having a motor with a work stroke and a return stroke, a hydraulic circuit for energizing the motor, a constant feed source supplying the circuit, and control means in the circuit for effecting slow rate and rapid rate actuation of the motor and for stopping the motor at any desired point of either stroke: a follow-up mechanism comprising a slide movable with the motor along a predetermined path; a function drum positioned along said path and operatively connected to the control means; a retractible finger mounted on the slide to contact the drum, means for mounting on the drum a plurality of function dogs spaced around the periphery thereof; indexing means for rotating the drum to bring a desired dog into said path; and means operable by the finger to actuate the indexing means.

21. In a machine having a motor with a work stroke and a return stroke, a hydraulic circuit for energizing the motor, a constant feed source supplying the circuit, and control means in the circuit for effecting slow rate and rapid rate actuation of the motor and for stopping the motor at any desired point of either stroke: a follow-up mechanism comprising a slide movable with the motor along a predetermined path; a function drum positioned along said path and operatively connected to the control means; and a retractible finger mounted on the slide to contact the drum, comprising a drum-contacting tip having a chamfer at the leading edge thereof in the direction of the work stroke and a notch following the chamfer and having a wall substantially perpendicular to the path of movement.

22. A follow-up mechanism as in claim 21 comprising means supporting the drum for limited axial movement; and means normally biassing the drum to actuate the control means in the direction of work stroke.

23. A follow-up mechanism as in claim 22 comprising an abutment on the drum positioned to engage the chamfer on the finger tip and to cam the finger toward partly retracted position; and actuating means on the slide operable by the partly retracted finger to actuate the control means from rapid rate to slow rate.

24. A follow-up mechanism as in claim 20 wherein the finger comprises a drum-contacting tip having a chamfer at the leading edge thereof in the direction of the work stroke and a notch following the chamfer and having a wall substantially perpendicular to the path of movement.

25. A follow-up mechanism as in claim 24 comprising means supporting the drum for limited axial movement; and means normally biassing the drum to actuate the control means in the direction of return stroke.

References Cited in the file of this patent

UNITED STATES PATENTS

| | | |
|---|---|---|
| 1,877,102 | Whitesell | Sept. 13, 1932 |
| 1,909,166 | Burrell | May 16, 1933 |
| 2,012,493 | Barnes | Aug. 27, 1935 |
| 2,160,920 | Strawn | June 6, 1939 |
| 2,272,684 | Vickers | Feb. 10, 1942 |
| 2,572,385 | Price | Oct. 23, 1951 |